Patented June 4, 1940

2,203,431

UNITED STATES PATENT OFFICE 2,203,431

FUNGICIDE

Marion C. Goldsworthy, Takoma Park, Md.; dedicated to the free use of the People in the territory of the United States No Drawing. Application January 15, 1940, Serial No. 313,893

1 Claim. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention described to the free use of the people in the territory of the United States, to take effect on the granting of a patent to me.

My invention relates to the use of 2.4 diamino-diphenylamine, or any of its isomeric forms, as a fungicide, in the control of plant diseases. 2.4 diamino-diphenylamine is a brown crystalline material, slightly soluble in cold water or gasoline; soluble in alcohol, chloroform, and benzol. It has a melting point of 123° C., a flash point of 420° F., and a specific gravity of 1.29.

The object of my invention is to furnish a material that in no way complicates the usual procedure for the preparation of spray fluids, dusts, or pastes, and one that is reasonable in price and easily manufactured.

A further object of my invention is to provide a new and suitable fungicide that exerts a superior fungicidal efficiency and one that does not in any way injure the plants to be sprayed, dusted, or painted.

A further object of my invention is to provide a new fungicide that exerts a superior fungicidal efficiency and one that is not toxic to man or beast while it remains on the plants or fruit sprayed, dusted, or painted.

My invention exerts a superior fungicidal toxicity and in no way has it proved deleterious to apple, peach, pear, plum or cherry bark, foliage, or fruits sprayed, dusted, or painted. It mixes or combines readily with lime talc, bentonite, fuller's earth, or a combination of any of these to form a mixture to which may be added a spreader, such as soap, casein, or synthetic aliphatic sulfonates, or an adhesive, such as natural fats or waxes, synthetic fats or waxes, mineral or vegetable oils, gums, resins, glue, or paints. It mixes readily with lime, bentonite, talc, activated carbon, or fuller's earth to form a fungicidal dust. It readily mixes with oils, paints, gums, resins, and colloidal clays to form a fungicidal paste for painting surfaces to prevent decay. My invention may be readily absorbed on wrapping tissue to form a product suitable for fungicidal protection of stored fruits. My invention may be used as a seed or soil disinfectant, either as a liquid or as a powder.

My invention has repeatedly proved toxic to the spores of the organisms causing brown rot of peaches and other stone fruits and apple bitter rot, and laboratory tests and field tests have proved its value in controlling peach brown rot, peach scab, apple scab, and cherry leaf spot.

I have repeatedly observed that 2.4 diamino-diphenylamine, when used at the rate of 1 pound to 50 gallons of water, is toxic to the spores of the peach brown rot and apple bitter rot fungi.

I have repeatedly observed that my invention, when combined with lime or bentonite or both in the proportions of 1 pound of 2.4 diamino-diphenylamine, 2 pounds of lime or 1 pound of bentonite, or both, forms a spray compound which, when added to 50 gallons of water, is toxic to the spores of the peach brown rot and apple bitter rot organisms.

While I have repeatedly observed that the above concentration of 2.4 diamino-diphenylamine, lime, bentonite, or both, in the proportions of 1 pound of 2.4 diamino-diphenylamine, 2 pounds of lime, 1 pound of bentonite, or both, is toxic to the spores of the peach brown rot and apple bitter rot organisms, I do not wish to be restricted in its application to plants or surfaces to such a concentration, but may add any amount of 2.4 diamino-diphenylamine, lime, bentonite, or both, to 50 gallons of water.

I have repeatedly observed that my invention, when suspended with water at the rate of 1 pound to 50 gallons of water or combined with lime, bentonite, or both, at the rate of 1 pound of 2.4 diamino-diphenylamine, 2 pounds of lime, 1 pound of bentonite, or both, causes no injury to the bark, leaves, or fruits when applied to peach, apple, plum, pear or cherry trees.

Having thus described my invention what I claim for Letters Patent is:

A fungicide containing as its essential active ingredient 2.4 diamino-diphenylamine.

MARION C. GOLDSWORTHY.